United States Patent Office 2,830,025
Patented Apr. 8, 1958

2,830,025

LUBRICATING COMPOSITIONS CONTAINING MONOMERIC CONDENSATION PRODUCTS OF ALKYLATED PHENOLS WITH CARBONYL-CONTAINING COMPOUNDS

Edwin C. Knowles, Poughkeepsie, and John A. Patterson and Herman D. Kluge, Fishkill, N. Y., assignors to The Texas Company, New York, N. Y., a corporation of Delaware No Drawing. Continuation of application Serial No. 248,654, September 27, 1951, which is a division of application Serial No. 178,348, August 8, 1950, now Patent No. 2,734,088, dated February 7, 1956. This application November 23, 1955, Serial No. 548,770

6 Claims. (Cl. 252—52)

This invention relates to new monomeric condensation products of substituted phenols with carbonyl compounds which have the property of imparting increased oxidation resistance to organic compounds, and to organic compositions containing them. More particularly, it is concerned with improved lubricating compositions containing these monomeric condensation compounds.

It is well known that lubricating oils undergo oxidation in service, particularly under the conditions of temperature and pressure prevailing in internal combustion engines and in modern steam turbines. Acidic compounds are formed by this oxidation which cause bearing corrosion and which also react further to form gums and sludges, with rapid deterioration in the lubricating properties of the oil. It is common practice to add to lubricating compositions organic compounds which have the property of acting as oxidation inhibitors. Among the compounds which have been used for this purpose are the phenols, including various alkylated phenols and phenolic resins. Many of these compounds are unsuitable because of an unfavorable effect which they have upon some of the lubricating characteristics of the oil such as viscosity or pour point. A common difficulty encountered in the use of antioxidants is that they tend to react chemically with other additives which may also be employed, with a loss in the effectiveness of either or both of the compounds or even with the formation of corrosive or other deleterious compounds. Many of the compounds which have been suggested, particularly those of a resinous or polymeric nature, are only difficultly soluble in oil and have a tendency to separate out in service. Others have a fairly high solubility in water or react with alkali metal compounds which may be present in the oil to form water soluble salts, making them unsuitable for use in oils which become contaminated with water during use.

We have now discovered a class of compounds which are particularly effective as oxidation inhibitors. These compounds do not affect adversely the lubricating properties of the oil or react with other addition agents commonly employed. They are highly insoluble in water and in alkaline solutions, so that they are of particular utility in compounding lubricants which are to be used in the presence of water, such as turbine oils.

The compounds of our invention are the monomeric condensation products of substituted phenols having one available ortho or para position, that is, one unsubstituted position ortho or para to the hydroxy group, and at least one position ortho to the hydroxy group occupied by a tertiary alkyl group, with carbonyl compounds of the class consisting of aldehydes and ketones. Preferably the condensation product has both positions ortho to each hydroxy group either substituted by tertiary alkyl groups, or one ortho position substituted by a tertiary alkyl group and the other involved in the condensation reaction. These compounds may be represented by the following formulas:

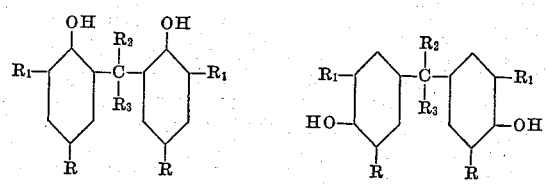

wherein R is a hydrocarbon radical which may be an alkyl, aryl, alkaryl or aralkyl radical, $R_1$ is a tertiary alkyl radical, $R_2$ is hydrogen or an alkyl radical and $R_3$ a hydrocarbon radical such as R. The hydrocarbon radicals represented by R, $R_1$, $R_2$ and $R_3$ may contain any of the usual types of inorganic substituents such as hydroxy, amino or halogen radicals insofar as these do not undesirably affect the characteristics of the compounds for use in lubricating compositions. In particular $R_3$ may be a substituted hydrocarbon radical such as a halogenated aliphatic group or a phenolic group containing at least one and preferably two tertiary alkyl groups ortho to the hydroxy group. R is preferably an alkyl radical containing from 1 to 12 carbon atoms, $R_1$ is a tertiary alkyl radical containing from 4 up to preferably 12 carbon atoms, $R_2$ is preferably hydrogen or a methyl radical and $R_3$ is preferably an alkyl radical or halogenated alkyl radical containing up to 7 carbon atoms.

As examples of these compounds the following may be mentioned: 1,1-bis (2-hydroxy-3-tertiary butyl-5-methylphenyl) ethane; 2,2-bis (2-hydroxy-3-tertiary butyl-5-methylphenyl) n-propane; 1,3-hexachloro-2,2-bis (2-hydroxy-3-tertiary butyl-5-methylphenyl) n-propane; 1,1-bis (4-hydroxy-3,5-di-tertiary amylphenyl) n-propane; 1,1-bis (4-hydroxy-3,5-di-tertiary butylphenyl) n-butane; 1,1-bis (2-hydroxy-3-tertiary octyl-5-methylphenyl) ethane; 1,1-bis (2-hydroxy-3-tertiary butyl-5-methylphenyl) n-butane; 2,2-bis (4-hydroxy-3,5-ditertiary hexylphenyl) propane; 1,1-bis (2-hydroxy-3-tertiary butyl-5-octylphenyl) n-butane; 1,1-bis (2-hydroxy-3-tertiary butyl-5-methylphenyl) isobutane; 1,1-bis (2-hydroxy-3-tertiary amyl-5-methylphenyl) butane; 1,1-bis (2-hydroxy-3-tertiary butyl-5-methylphenyl) n-hexane; 1,1-bis (2-hydroxy-3-tertiary amyl-5-hexylphenyl) ethane; 1,1-bis (2-hydroxy-3-tertiary butyl-5-methylphenyl)-2-trichloroethane; 1,1-bis (2-hydroxy-3-tertiary butyl-5-methylphenyl)-2-trifluoroethane; 1,1-bis (2-hydroxy-3-tertiary butyl-5-methylphenyl) cyclohexane; 2,2-bis (2-hydroxy-3-tertiary butyl-5-methylphenyl) n-butane; 2,2'-dihydroxy-3,3'-ditertiary butyl-5,5'-dimethyl tritane; and 2,2',4''-trihydroxy-3,3',3'',5''-tetra-tertiary butyl-5,5'-dimethyl tritane.

As previously stated, these compounds are effective antioxidants for organic compounds generally which tend to undergo deterioration or alteration in the presence of oxygen. They are of particular utility in compounding mineral oil lubricants which normally undergo considerable oxidation in service with the formation of acidic compounds and sludges. These compounds greatly reduce this oxidative tendency in mineral oils when present in the oil even in very small amounts. In general it is preferred to add these compounds to the oil in amounts of about 0.01 to about 5 percent, and usually about 0.1 to 1.0 percent, by weight based on the weight of the oil.

The compounds of our invention may readily be prepared by carrying out a controlled condensation reaction between a disubstituted phenol having at least one tertiary alkyl group ortho to the hydroxy group and a suitable aldehyde or ketone. As an alternative method an unsubstituted or monosubstituted phenol may be condensed with an aldehyde or ketone under conditions controlled to give the monomeric condensation product and this product alkylated to give the desired compound. Because of the difficulty in controlling condensation reactions involving formaldehyde it is preferred to employ aldehydes containing at least two carbon atoms to the molecule. With aliphatic aldehydes containing more than about 7 carbon atoms and with higher aliphatic ketones the condensation reaction proceeds only with difficulty, so that the preferred reactants of this class are the lower aliphatic ketones, aliphatic aldehydes containing from 2 to 7 carbon atoms to the molecule and aromatic aldehydes. Suitable compounds include acetaldehyde, chloral, butyraldehyde, iso-butyraldehyde, benzaldehyde, salicylaldehyde and acetone. When the aldehyde or ketone employed in the condensation contains a phenolic group, this group should have at least one, and preferably two, tertiary alkyl groups ortho to the hydroxy group, or such groups may be introduced by alkylation after the condensation reaction.

According to the preferred method for producing these compounds, two mols of a suitable disubstituted phenol is reacted with one mol of an aldehyde or a ketone of the type described above in the presence of HCl as a catalyst. The reaction may be carried out in the cold in the presence of a solvent such as glacial acetic acid, or in some cases improved results are obtained by operating in the absence of a solvent and at room temperature. As an example of this method, 1,1-bis-(2-hydroxy-3-tertiary butyl-5-methylphenyl) n-butane was prepared in yields as high as 93 percent of the theoretical by reacting 4-methyl-2-tertiary butyl phenol and n-butyraldehyde at room temperature and without a solvent in the presence of anhydrous HCl as a catalyst. As another example of the method, 2,2'-dihydroxy-3,3'-di-tertiary butyl-5,5'-dimethyl tritane was prepared in a 43 percent yield by reacting 4-methyl-2-tertiary butyl phenol and benzaldehyde in the presence of anhydrous HCl as a catalyst and of glacial acetic acid as a solvent, while the mixture was cooled in an ice bath. As a further example of the method of preparing these compounds, 1,1-bis (2-hydroxy-3-tertiary butyl-5-methylphenyl)-2-trichloroethane was prepared in a 76 percent yield by reacting 4-methyl-2-tertiary butylphenol with chloral at room temperature and without a solvent in the presence of anhydrous HCl as a catalyst.

A number of compounds were prepared by the above described method and their effectiveness as oxidation inhibitors evaluated by means of the ASTM turbine oil oxidation test. This test is carried out by bubbling oxygen through a sample of oil in the presence of water and of spirals of iron and of copper in an oxidation cell which is maintained at 95° C. Portions of the oil are withdrawn periodically and the neutralization number determined. The test is continued until the neutralization number of the oil reaches 2.0. Table 1 below shows the results obtained by adding small amounts of typical compounds of our invention to a reference oil, which was a solvent-refined, acid-treated and filtered mineral lubricating oil having a Saybolt viscosity of 485–515 seconds at 100° F.

Table 1

| | Neutralization number of blended oil | Hours to 2.0 neutralization number |
|---|---|---|
| Reference oil | | 75 |
| Reference oil+0.2% of 1,1-bis (2-hydroxy-3-tertiary butyl-5-methylphenyl) ethane | 0.02 | 200 |
| Reference oil+0.6% of 1,1-bis (2-hydroxy-3-tertiary butyl-5-methylphenyl) ethane | 0.03 | 400 |
| Reference oil+0.2% of 1,1-bis (2-hydroxy-3-tertiary butyl-5-methylphenyl) isobutane | | 400 |
| Reference oil+0.5% of 1,1-bis (2-hydroxy-3-tertiary butyl-5-methylphenyl) isobutane | | 825 |
| Reference oil+0.2% of 1,1-bis (2-hydroxy-3-tertiary butyl-5-methylphenyl) n-butane | | 375 |
| Reference oil+0.4% of 1,1-bis (2-hydroxy-3-tertiary butyl-5-methylphenyl) n-butane | | 500 |
| Reference oil+0.6% of 1,1-bis (2-hydroxy-3-tertiary butyl - 5 - methylphenyl) - 2 - trichloroethane | | 432 |
| Reference oil+0.3% of 2,2'-dihydroxy-3,3'-di-tertiary butyl-5,5'-dimethyl tritane | | 125 |
| Reference oil+0.5% of 2,2'-dihydroxy-3,3'-di-tertiary butyl-5,5'-dimethyl tritane | | 200 |

The above data show that all of the compounds tested imparted a substantial improvement in the oxidation stability of the base oil.

Additional tests were carried out on our compounds in oils containing other addition agents which have been used in compounding lubricants. It was found that the effectiveness of our compounds as oxidation inhibitors was greatly enhanced in the presence of certain of these other addition agents, namely the class of compounds comprising oil-miscible organic phosphates and the class of compounds comprising oil-miscible alkyl dicarboxylic acids as disclosed in U. S. Patent No. 2,452,321. The improvement obtained by the use of these compounds in conjunction with the compounds of our invention was much greater in every case tested than the mere sum of their separate effects, and this result is not predictable on the basis of the chemical nature of the individual compounds. This property of our compounds in acting cooperatively with these other antioxidants and corrosion inhibitors is of great importance, particularly in the compounding of turbine oils, where the use of corrosion inhibitors is necessary to prevent rusting of the metal surfaces by the water which contaminates the oil, and accordingly lubricant compositions comprising our novel compounds together with these other compounds is a preferred embodiment of our invention. The organic phosphates employed are oil-soluble or miscible alkyl acid phosphates and preferably those having a total of at least 10 alkyl carbon atoms containing at least one replaceable hydrogen linked to the phosphorus through an oxygen atom. Examples of the type of compound falling within this classification which have been found satisfactory for use in the inhibitor combination are the following: dilauryl acid pyrophosphate, n-butyl oleyl acid orthophosphate, monolauryl acid orthophosphate, and butyl lauryl acid orthophosphate. A suitable material of this character is a commercial product consisting of a phosphate of long chain alcohols, sold under the trade name of "Ortholeum-162" (O-162). The alkyl dicarboxylic acids employed in the combination may be any oil-soluble or miscible dicarboxylic acids having at least one carbon atom between the carboxyl groups and preferably those having at least 10 carbon atoms in the molecule. Such acids include the derivatives of aromatic dicarboxylic acids, cycloaliphatic dicarboxylic acids and aliphatic dicarboxylic acids. As examples of such compounds may be mentioned alkylated phthalic acid, alkylated hexahydrophthalic acid, alkyl malonic acid, alkyl maleic acid, alkenyl succinic acid and alkyl citraconic acid. A preferred material of this character is obtained by condensation of maleic acid anhydride and a polymer gasoline distillate, B. P. 385–400° F. For convenience this material is designated as "AMA" in the following disclosure.

Table 2 below shows the results obtained by using our compounds in conjunction with small amounts of "AMA" and "O-162" in the ASTM turbine oil oxidation test described above, and also in a modified ASTM rusting test using synthetic sea water. In this latter test a polished steel specimen is suspended in an agitated mixture of 300 cc. of the oil to be tested and 30 cc. of a synthetic sea water, maintained at 140° F. After 48 hours the steel specimen is removed, washed with precipitation naphtha or hexane and the amount of corrosion or rust observed. The synthetic sea water added to the test oil contains 11.0 g. per liter of magnesium chloride ($MgCl_2 \cdot 6H_2O$), 1.2 g. anhydrous calcium chloride ($CaCl_2$), 4.0 g. anhydrous sodium sulfate ($Na_2SO_4$) and 25.0 g. sodium chloride (NaCl). The base oil used in this test was the same as that used in the ASTM turbine oil oxidation test.

Table II

| Additives | Neutralization number of blended oil | Hours to 2.0 neutralization number | Rusting test |
|---|---|---|---|
| 0.015% AMA+0.0025% O-162 | | 150 | clean. |
| 0.5% 1,1-bis (2-hydroxy-3-tertiary butyl-5-methylphenyl) isobutane+0.015% AMA+0.0025% O-162 | | 1,390 | Do. |
| 0.2% 1,1-bis (2-hydroxy-3-tertiary butyl-5-methylphenyl)-n-butane + 0.01% AMA+0.0025% O-162 | 0.06 | 650 | Do. |
| 0.3% 1,1-bis (2-hydroxy-3-tertiary butyl-5-methylphenyl)-n-butane+0.015% AMA+0.0025% O-162 | 0.04 | 1,000 | Do. |
| 0.4% 1,1-bis (2-hydroxy-3-tertiary butyl-5-methylphenyl)-n-butane+0.015% AMA+0.0025% O-162 | | 1,290 | Do. |
| 0.2% 4-methyl-2,6-di-tertiary butyl phenol+0.01% AMA+0.0025% O-162 | 0.09 | 470 | Do. |
| 0.5% 4-methyl-2,6-di-tertiary butyl phenol+0.01% AMA+0.0025+ O-162 | 0.05 | 880 | Do. |

As can be seen from the above table, the addition of small amounts of our compounds to a lubricating oil together with small amounts of "AMA" and "O-162" produces a lubricating composition having substantially greater oxidation stability than an oil containing like amounts of "AMA," "O-162" and 2,6-di-tertiary butyl-4-methyl phenol, which is generally rated as a very effective antioxidant.

It is to be understood that the invention is not limited to the specific examples mentioned above, but also includes other compositions containing compounds falling within the scope of our invention as set forth in the specification and claims. Other additives of the type commonly employed as lubricant additives such as oxidation inhibitors, pour point depressors, oiliness agents, color stabilizers, extreme pressure agents, V. I. improvers, etc., may be used in conjunction with our novel compounds instead of or in addition to the oilmiscible organic phosphates and dicarboxylic acids disclosed specifically.

This application is a continuation of our co-pending application Serial No. 248,654, filed September 27, 1951, now abandoned, which is a division of our co-pending application Serial No. 178,348, filed August 8, 1950, now U. S. Patent No. 2,734,088.

Obviously many modifications and variations of the invention, as hereinbefore set forth, may be made without departing from the spirit and scope thereof, and therefore only such limitations should be imposed as are indicated in appended claims.

We claim:

1. A lubricant composition comprising a major amount of a mineral lubricating oil and 0.1 to 5.0 percent by weight, sufficient to confer antioxidant properties to the composition, of a compound selected from the class consisting of 1,1 - bis (2 - hydroxy - 3 - tertiary butyl - 5-methylphenyl) n - butane, 1,1 - bis (2 - hydroxy - 3 - tertiary butyl - 5 - methylphenyl) isobutane and 1,1 - bis (2 - hydroxy - 3 - tertiary butyl - 5 - methylphenyl) - 2-trichloroethane.

2. A lubricant composition comprising a major amount of a mineral lubricating oil and 0.1 to 5 percent, and preferably 0.1 to 1 percent by weight of 1,1-bis(2-hydroxy-3-tertiary butyl-5-methylphenyl) n-butane.

3. A lubricant composition comprising a major amount of a mineral lubricating oil and 0.1 to 5 percent, and preferably 0.1 to 1 percent, by weight of 1,1-bis(2-hydroxy-3-tertiary butyl-5-methylphenyl) isobutane.

4. A lubricant composition comprising a major amount of a mineral lubricating oil and 0.1 to 5 percent, and preferably 0.1 to 1 percent, by weight of 1,1-bis(2-hydroxy-3-tertiary butyl-5-methylphenyl)-2-trichloroethane.

5. A lubricant composition comprising a major amount of a mineral lubricating oil and in combination therewith 0.01–3.0 percent by weight of an oil-miscible alkyl dicarboxylic acid containing at least 10 carbon atoms, 0.0001–5.0 percent by weight of an alkyl acid phosphate containing at least 10 alkyl carbon atoms, and 0.1–1 percent by weight of 1,1-bis(2-hydroxy-3-tertiary butyl-5-methylphenyl) butane.

6. A lubricant composition comprising a major amount of a mineral lubricating oil and in combination therewith 0.01–3.0 percent by weight of an oil-miscible alkyl dicarboxylic acid containing at least 10 carbon atoms, 0.0001–5.0 percent by weight of an alkyl acid phosphate containing at least 10 alkyl carbon atoms, and 0.1–1 percent by weight of a 1,1-bis(2-hydroxy-3-tertiary butyl-5-methylphenyl) isobutane.

References Cited in the file of this patent

UNITED STATES PATENTS

| 2,017,827 | Bannister | Oct. 15, 1935 |
| 2,202,877 | Stevens | June 4, 1940 |
| 2,270,959 | Murke | Jan. 27, 1942 |
| 2,295,985 | Baird | Sept. 15, 1942 |